(12) United States Patent
Kamatani et al.

(10) Patent No.: US 6,802,321 B2
(45) Date of Patent: Oct. 12, 2004

(54) MASTER MEDIUM CLEANING METHOD

(75) Inventors: Akito Kamatani, Kanagawa-ken (JP); Masakazu Nishikawa, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 10/146,913

(22) Filed: May 17, 2002

(65) Prior Publication Data
US 2002/0170665 A1 Nov. 21, 2002

(30) Foreign Application Priority Data

| May 18, 2001 | (JP) | 2001-148640 |
| Jul. 6, 2001 | (JP) | 2001-206446 |
| Sep. 28, 2001 | (JP) | 2001-302236 |

(51) Int. Cl.[7] .......................... C25F 5/00; C03C 23/00; B08B 7/04; B32B 35/00; G11B 7/26
(52) U.S. Cl. ................. 134/1.1; 134/2; 134/4; 156/94; 156/247; 156/272.2; 156/344
(58) Field of Search ................. 156/230, 232, 156/233, 240, 247, 289, 272.2, 299, 344, 94; 134/1.1, 2, 4, 36, 26, 1, 3.9, 42

(56) References Cited

U.S. PATENT DOCUMENTS

| 4,455,636 A | 6/1984 | Tsutsui et al. |
| 5,174,856 A | 12/1992 | Hwang et al. |
| 5,451,263 A | 9/1995 | Linn et al. |
| 5,810,941 A * | 9/1998 | Moynagh .......... 134/4 |
| 6,347,016 B1 | 2/2002 | Ishida et al. |

FOREIGN PATENT DOCUMENTS

| EP | 1 209 668 A2 | 5/2002 | |
| FR | 2 534 040 A1 | 4/1984 | |
| FR | 2 751 128 A1 | 1/1998 | |
| FR | 2751128 * | 1/1998 | .......... B29D/17/00 |
| JP | 10-40554 | 2/1998 | |
| JP | 63-183623 | 7/1998 | |
| JP | 10-269566 | 10/1998 | |
| JP | 2000-285367 | 10/2000 | |
| WO | WO 95/07152 A1 | 3/1995 | |

OTHER PUBLICATIONS

Japanese Abstract No. 2000285637, dated Oct. 13, 2000.

* cited by examiner

Primary Examiner—Jerry A Lorengo
(74) Attorney, Agent, or Firm—Sughrue Mion, PLLC

(57) ABSTRACT

The foreign matter adhered to the data bearing surface of a master medium is removed by use of a dry, non-contact removal process, so as to facilitate the performance of a high transfer quality magnetic transfer. Before performing a magnetic transfer or forming an optical disk, a magnetic transfer master medium or an optical disk master medium is placed in a vacuum chamber. The vacuum chamber is evacuated by an evacuating means, and a reactive gas is introduced thereto by a gas introducing means. In the state in which the chamber has been evacuated and the reactive gas has been introduced thereto, a discharging means applies a discharge voltage in the chamber, causing a plasma discharge to be generated between the master medium and an electrode. The plasma etching action of the plasma discharge burns off the foreign matter adhered to the surface of the master medium.

9 Claims, 3 Drawing Sheets

MASTER MEDIUM CLEANING METHOD

BACKGROUND OF THE INVENTION

1 Field of the Invention

The present invention relates in general to a master medium cleaning method, and in particular to a method of cleaning magnetic transfer master mediums, which are used to perform magnetic transfers, or optical disk master mediums, which are used in manufacturing optical disks.

2 Description of the Related Art

A magnetic transfer method is a method comprising the steps of: bringing a master medium, on which a transfer pattern has been formed, into close contact with a slave medium, which has been provided with a magnetic recording portion for receiving the transfer, to form a conjoined body; and applying a transfer magnetic field to the conjoined body so as to transfer and record the magnetic pattern corresponding to the transfer data (such as servo signals) onto the slave medium. This magnetic transfer method has been described in Japanese Unexamined Patent Publication Nos. 63(1988)-183623, 10(1998)-40544, and 10(1998)-269566, for example.

The master medium employed in the magnetic transferred is formed of a silicon substrate or a glass substrate, for example, on the surface of which an uneven pattern composed of a magnetic body is formed by use of a photo lithography process, a sputtering process, an etching process, or the like. Further, magnetic transfer master mediums can also be manufactured by use of a lithography technology such as that used in the manufacture of semiconductors, or a stamping technology such as that used in the manufacture of optical disks.

In order to improve the quality of the magnetic transfer described above, it is necessary that the slave medium and the master medium be conjoin so that no gap whatsoever exists therebetween. That is to say, if there are contact deficiencies therebetween, regions on which a magnetic transfer can not be performed occur; if a magnetic transfer can not be performed, signal omissions occur in the magnetic data transferred to the slave medium and the signal quality thereof is reduced, and for cases in which the transferred data are servo signals, an adequate tracking function can not be obtained, whereby a problem arises in that the reliability is reduced.

However, when performing magnetic transfers according to the magnetic transfer method described above, the surface of the master medium becomes littered with foreign matter that becomes attached thereto through the repeated usage thereof. This foreign matter can consist of dust, fiber strands and other debris originating in the surrounding environment.

If a magnetic transfer is performed when there is dust or other debris attached to the surface of the master medium, adequate contact between the area of the surface of the master medium centering on the dust or debris attached thereto and the surrounding vicinity thereof and the corresponding area of the slave medium cannot be ensured; whereby a pattern of a predetermined signal level cannot be transferred, and the transfer quality becomes deteriorated thereby. By repeatedly bringing a master medium, onto the surface of which foreign matter has become attached, into close contact with slave mediums, the attachment strength of the foreign matter to the surface of the master medium is heightened; whereby deficiencies in pattern transfer of the same or greater magnitude are repeated during the performance of magnetic transferences to slave mediums subsequently brought into close contact with said master medium, and said foreign matter becomes the cause of multiple faulty products. Further, the surface of the master medium becomes deformed by this attached debris, and a problem arises in that the proper functionality thereof is lost.

In this regard, cleaning technology, wherein a cleaning disk to which a cleaning pad has been attached is rotated while in contact with the surface of the master medium to remove dust and debris that have become attached thereto has been proposed as described in Japanese Unexamined Patent Publication No. 2000-285637, for example.

However, in performing cleaning using cleaning technology such as that described above, for cases in which the transfer pattern formed on the data bearing surface of the master medium is provided as an uneven form, foreign matter becoming lodged in the depression portions thereof is difficult to remove. Further, there are cases such as those in which foreign matter originating in the surrounding environment becomes embedded in the depression portions, cases in which the surface of the master medium becomes marred or scratched due to foreign matter, and cases in which it is not possible to remove minute particulate foreign matter that has become adhered to the surface of the medium, giving rise to a fear that transfer deficiencies caused thereby will not be corrected due to the inadequacy of the cleaning process. In particular, because master mediums are expensive, from the standpoint of cost, it is advantageous that the master mediums be reusable and have a long life span.

Further, cleaning methods performed before the magnetic transfer process in order to remove foreign matter that has become adhered to the surface of the master medium, such as an ultrasound cleaning using a cleansing liquid, a wiping cleaning, or the like can also be considered. However, it is possible that the foreign matter removed thereby becomes re-adhered after performing a cleansing by one of these methods, that the removal of the foreign matter is insufficient, that a watermark occurs on the surface of the master medium when the cleansing liquid has dried, or that the surface of the master medium becomes marred or scratched due to abrasion by the wiping material, giving rise to a fear that these become the origin of damage to the master medium, and that transmission deficiencies occur in the transferred signal. That is to say, even if foreign matter adhered to the surface of the master medium is temporarily removed by use of a cleansing liquid, a wiping material or the like, there are cases in which foreign matter in the form of washing liquid remaining on the surface of the master medium, or foreign matter from the wiping material becomes attached to the surface of the master medium; in particular, it is not possible to remove some of the minute particulate foreign matter that has become adhered to the surface of the medium.

When performing a magnetic transfer, the master medium and the slave medium are put into close contact with each other and a magnetic field is applied to the mediums to magnetically transfer the shape of the pattern of the master medium onto the slave medium. If something remains between the master medium and the slave medium in this process, an air gap is formed between the mediums and transmission deficiencies occur. This was discovered by inspecting the master medium that was reused after washing by the above-mentioned cleaning method. That is, it was discovered that the number of surface defects was increased by the cleaning method. There are cases in which the signal omissions occurring due to foreign matter having become adhered to the surface of the master medium in the course of the above-described magnetic transfer are present from the initial stages thereof when slave mediums are exchanged one after the other and the magnetic transfer is performed a plurality of times in succession. It has been determined that this is due to foreign matter that has become adhered to the surface of the master medium during the manufacture thereof. Further, analysis of the attached foreign matter has shown that the foreign matter is composed of organic matter; the foreign matter has been determined to be formed of the same source material as the coating material used to form the protective layer provided over the pattern of the substrate of the master medium.

More specifically, as described above, a pattern corresponding to the transfer signal is formed on the surface of the master medium, and a magnetic layer is formed over said pattern; because the pattern forming process and the magnetic layer forming process are performed separately, in order to prevent the attachment of foreign matter or marring of the surface of the master medium in the interim between the performance of said processes, a protective coating formed of organic material has been applied over the pattern.

Then when the magnetic layer is to be formed, the protective layer is peeled away from the surface of the pattern formed on the substrate, and the magnetic layer is formed thereon by use of a sputtering method; however, even after the protective layer has been peeled off, a portion thereof remains on the surface of the pattern, and this remaining portion of the protective layer is aerially dispersed during the magnetic layer forming process and becomes attached to the surface thereof thereafter, whereby the occurrence of signal omissions due to contact deficiencies is brought about. Further, material of the protective layer remaining between the substrate and the magnetic layer causes a reduction of the contact property of both the substrate and the magnetic layer, which becomes a cause of the peeling away of the magnetic layer from the substrate, giving rise to a problem in the reduction in the durability of the master medium.

On the other hand, stamping methods employed in manufacturing optical disks are methods of forming a resin layer on the uneven pattern of the data bearing surface of a master medium (a so-called stamper) optical disk. Then, the surface of the optical disk, which comprises a resin layer having an uneven form corresponding to the transfer data, is coated with a thin film formed of a reflective material, and a protective layer is further provided.

Therefore, because the master medium optical disks are manufactured in a continuous manner wherein a cleaning process is not performed during the course of the manufacture thereof, after the number of disks manufactured exceeds one-thousand, foreign matter becomes adhered to the surface of the optical disks in the same manner as for the magnetic transfer master mediums; this leads to an increase in the error rate of the optical disks, whereby it becomes difficult to produce optical disks having a high degree of reliability.

In view of the forgoing points, cleaning processes such as an electrolytic degreasing cleansing or a ultrasound cleansing employing liquid detergent, or an ozone cleaning apparatus are employed to clean the master medium optical disk; however, there are cases in which it is not possible to remove particles which have become firmly affixed to the surface of the optical disk. It has been particularly difficult to completely remove foreign matter from the depression portions of the uneven pattern, which results in formational deficiencies.

SUMMARY OF THE INVENTION

The present invention has been developed in view of the forgoing problems, and it is an objective of the present invention to provide a magnetic transfer master medium cleaning method; wherein, the foreign matter that has adhered to the surface of the master medium and which has originated from the protective layer provided on the substrate of the master medium is removed, and a high quality magnetic transfer is capable of being performed to the master medium that has been cleaned thereby.

Further, it is a further objective of the present invention to provide a master medium cleaning method of cleaning a magnetic transfer master medium or a master medium optical disk; wherein, the foreign matter that has become embedded in the depression portions of the uneven pattern of the magnetic transfer master medium or the master medium optical disk, including the minute particulate foreign matter, is completely removed, and a high quality magnetic transfer is capable of being performed by the magnetic transfer master medium or production of optical disks is possible by use of the master medium optical disk, which have been cleaned thereby.

The master medium cleaning method according to the present invention is a method of cleaning a master medium comprising a substrate having a pattern formed thereon, and a magnetic layer formed over said pattern, implemented by cleaning the surface of the substrate on which the pattern has been formed, before the formation of the magnetic layer thereover, by use of a plasma discharge carried out in an evacuated reactive gas environment.

A protective layer formed of an organic material is formed over the surface of the substrate of the master medium whereon the pattern has been formed, and the material from said protective layer remaining thereon after said protective layer has been peeled away from said surface is removed by incineration.

The cleaning apparatus implementing the cleaning according to the present invention comprises: a chamber for housing the master medium, an evacuating means for reducing pressure in the chamber, a plasma discharging means for discharging plasma between the electrode of the chamber and the master medium, and a gas introducing means for introducing a reactive gas into the chamber; wherein, the plasma is discharged in the state wherein the chamber has been vacuumed and the reactive gas has been introduced thereto, whereby the foreign matter adhered to the surface of the master medium is burned off of the surface of the master medium by the plasma discharge.

Another master medium cleaning method according to the present invention is a method implemented during the manufacture of a master medium, wherein the surface of a substrate, on which a pattern has been formed, is cleaned by plasma discharge within an pressure reduced reactive gas environment. That is, the remnants of a protective film are burned off of the substrate by the plasma discharge within the pressure reduced reactive gas environment after the protective film is peeled off of the substrate, on which a pattern has been formed, and before the formation of a magnetic layer thereon.

Yet another master medium cleaning method according to the present invention is a method of removing the foreign matter adhered to the data bearing surface, on which an uneven pattern corresponding to data has been formed, of a magnetic transfer master medium or a master medium optical disk, comprising the steps of: providing a film over the data bearing surface of the master medium, and removing the foreign matter adhered to the data bearing surface of the master medium along with said film.

The film can be, for example, a carbon layer; wherein, when the cleaning process is to be performed, this carbon layer is removed by the use of plasma. Further, the film can be a polymer film; wherein, when the cleaning process is to be performed, this polymeric film is removed by the use of a solvent or plasma. The removal of the film can also be performed by the use of an ultrasound cleansing that causes the film to be peeled away from the surface of the master medium. The film can be formed on the surface of the master medium by use of any of a variety of film forming methods: a sputtering method of sputtering a material containing carbon onto the surface of the master medium; a film forming method employing a CVD; a vapor deposition method of depositing a polymeric material onto the surface of the master medium; etc. A favorable magnetic transfer property and film formation property can be ensured for at a film thickness of less than or equal to 40 nm. If the film is thicker than 40 nm, in the case that a magnetic transfer is to be performed, the distance between the surface of the pattern and the slave medium is increased, causing a deterioration of the transfer property and a reduction in resolution, and in the case that an optical disk is to be formed, the change in the disk formation dimensions becomes large.

For cases in which the magnetic transfer master medium or the optical disk master medium is to be reused after having been subjected to the cleaning process, the film is reformed on the respective data bearing surface thereof and the master medium is reused.

Further, in the case of the magnetic transfer master medium, the film can be the magnetic layer formed on the pattern surface of the substrate. When the cleaning process is to be performed, the magnetic layer is removed, and when the master medium is to be reused, the magnetic layer is reformed by a sputtering process or the like.

It is advantageous that the cleaning be performed in connection with the magnetic transfer or optical disk manufacture for each magnetic transfer (disk formation process), or after the magnetic transfer (formation) has been performed a predetermined number of times. Alternatively, it is preferable that the magnetic transfer master medium or the optical disk master medium be removed from the magnetic transfer apparatus or the disk formation apparatus, respectively, when transfer deficiencies or formation deficiencies due to adhered foreign matter occur, and then the cleaning process be performed. At this time, the efficiency obtained by preparing a plurality of master mediums and performing successive magnetic transfer or disk formation and cleaning processes in repetition is desirable.

According to the present invention described above, when a master medium having a magnetic layer formed over the uneven pattern surface of the substrate thereof is to be formed, because the pattern surface of the substrate has been cleaned, by use of a plasma discharge in an evacuated reactive gas environment, before the formation of the magnetic layer thereon, the material remaining from the protective layer can be completely removed when the magnetic layer is to be formed. Thereby the foreign matter originating in the protective layer and which becomes adhered to the surface of the master medium can be reduced, the occurrence of signal omissions due to contact deficiencies between the master medium and the slave medium can be reduced, magnetic transfers having a stable transfer quality can be performed and the reliability thereof improved, and the life span of the master medium can be extended.

Further, by providing a film on the data bearing surface of the magnetic transfer or optical disk master medium so as to remove the foreign matter adhered to the pattern surface of the master medium together with the film when the cleaning process is performed, the foreign matter including even minute particulate matter can be positively removed. Further, in particular for foreign matter that has become imbedded in the depression portions of the uneven pattern surface, because the width of the channels of the depression portions becomes wider upon the removal of the film from the side walls thereof, the foreign matter imbedded therein can be easily removed, the cause of transfer deficiencies and formation deficiencies are eliminated, the master medium becomes reusable, magnetic transfers having a stable transfer quality can be performed and the reliability thereof improved, and the life span of the master medium can be extended.

DESCRIPTION OF THE PREFERRED EMBODIMENTS

Figure 1:
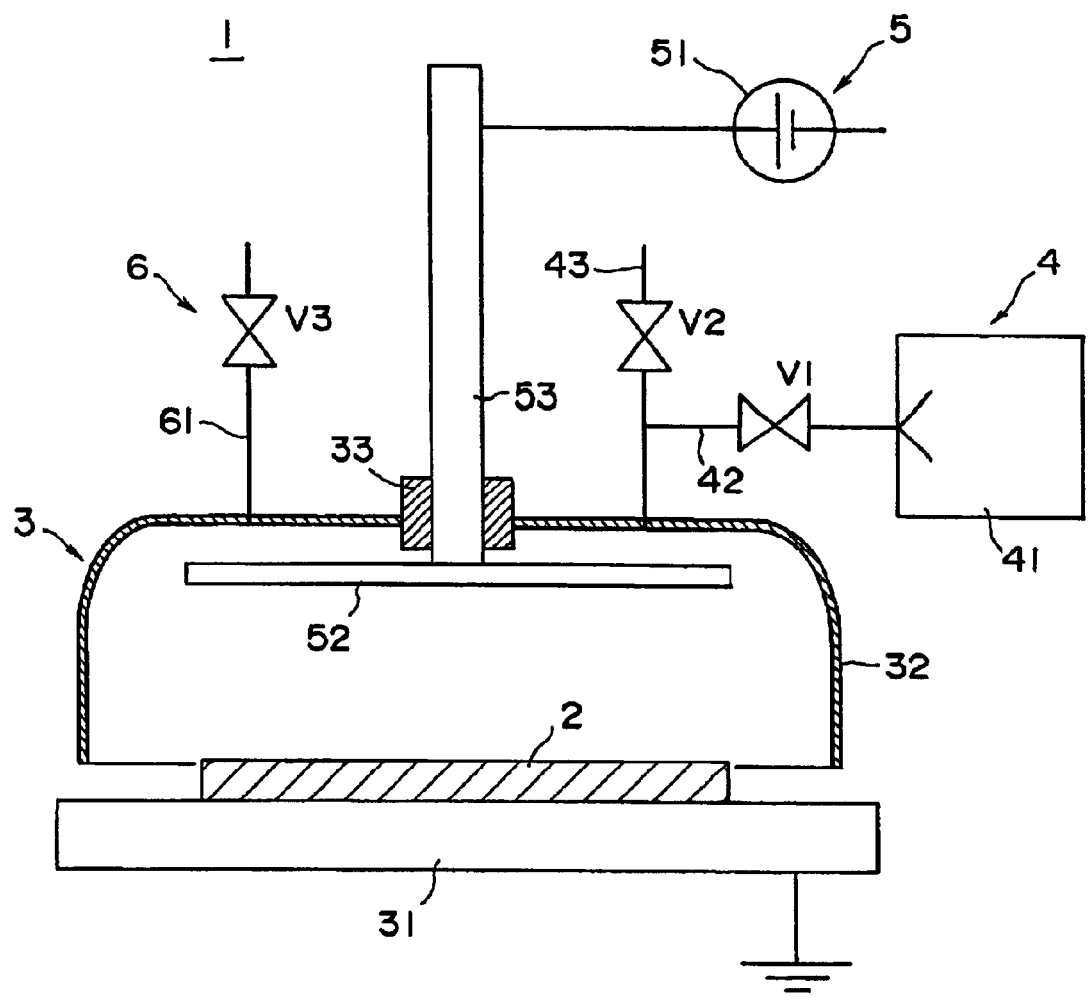
FIG. 1 is a schematic drawing of a cleaning apparatus implementing the cleaning method according to an embodiment of the present invention.

Hereinafter the preferred embodiments of the present invention will be explained with reference to the attached drawings. FIG. 1 is a schematic drawing of a cleaning apparatus implementing the cleaning method according to an embodiment of the present invention.

The cleaning apparatus shown in FIG. 1 comprises: a vacuum chamber 3 for accommodating a master medium 2; an evacuating means 4 for vacuuming the chamber 3; a discharging means 5 for generating a plasma discharge between the electrode 52 within the chamber 3 and the master medium 2; and a gas introducing means 6 for introducing a reactive gas into the chamber 3.

The vacuum chamber 3 is provided with a cap shaped cover member 32 for fitting over the base member 31 so as to hermetically seal the interior space of the chamber 3, wherein the base member 31 and the cover member 32 are movable relative to the contact and separation directions thereof, so as to facilitate the opening and closing operations thereof, and the master medium 2 is exchangeably accommodated therein. The master medium 2 is loaded onto the base member 31. The master medium 2 loaded onto the base member 31 is in a state of electrical conductivity with the electrically grounded base member 31, and serves as one of the electrodes when the discharge is performed, as described below.

The evacuating means 4 comprises a vacuum pump 41, and a vacuum channel 42 from the vacuum pump 41 is connected to the cover member 32. The vacuum pump 41 removes the air within the interior of the chamber 3 by way of the vacuum channel 42 and by use of vacuum suction so as to de-pressurize the interior of the chamber 3 to a predetermined pressure. A first valve V1 is disposed along the vacuum channel 42, and is controlled so as to open when the vacuum operation is performed and to close when the pressure is to be released. Further, the vacuum channel 42 is provided with a merging leakage channel 43 on the same side of the chamber 3 as the valve V1. This leakage channel 43 communicates with a leakage port, wherein a second valve V2 is disposed along the leakage channel 43. The valve V2 is controlled so as to close when the vacuum operation is performed and to open when the pressure is to be released.

The discharging means 5 comprises an electric power source 51 (a DC power source) for generating a discharge voltage, and a plate shaped electrode 52 disposed on the interior of the cover member 32. The plate shaped electrode 52 is supported on a support member 53 that extends through the cover member 32, and is connected to the power source 52 by a conductive member (not shown) disposed on the interior portion of the plate support member 53. An insulating seal 33 is installed between the support member 53 and the cover member 32, whereby the cover member 32 is electrically insulated. The plate shaped electrode 52 is counterposed to the master medium 2 that has been loaded onto the base member 31, and the discharge voltage generated by the power source 51 is applied between the plate shaped electrode 52 and the master medium 2, whereby a plasma discharge is generated on the master medium 2. Note that the power source 51 can be an RF power source such as that described below. When an RF power source is used, the RF power source may be connected to generate a plasma discharge with the base member electrically floated.

The gas introducing means 6 comprises: a gas tank (not shown) for storing the reactive gas; and a gas introducing channel 61 leading from the gas tank and connected to the cover member 32 for introducing a predetermined quantity of a highly reactive gas into the interior portion of the chamber 3. A third vale V3 is disposed along the gas introducing channel 61, and is controlled so as to open when the gas is to be introduced to the chamber 3. The reactive gas can be compositions containing Ar, $O_2$, $CCl_4$, and the like.

Figure 2:
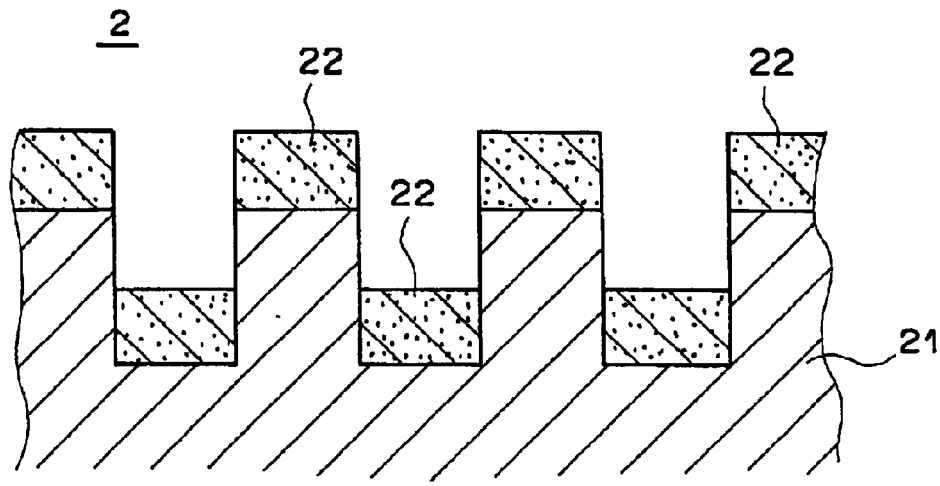
FIG. 2 is a cross-sectional view of the main part of a master medium according to an embodiment of the present invention.
Figure 3:
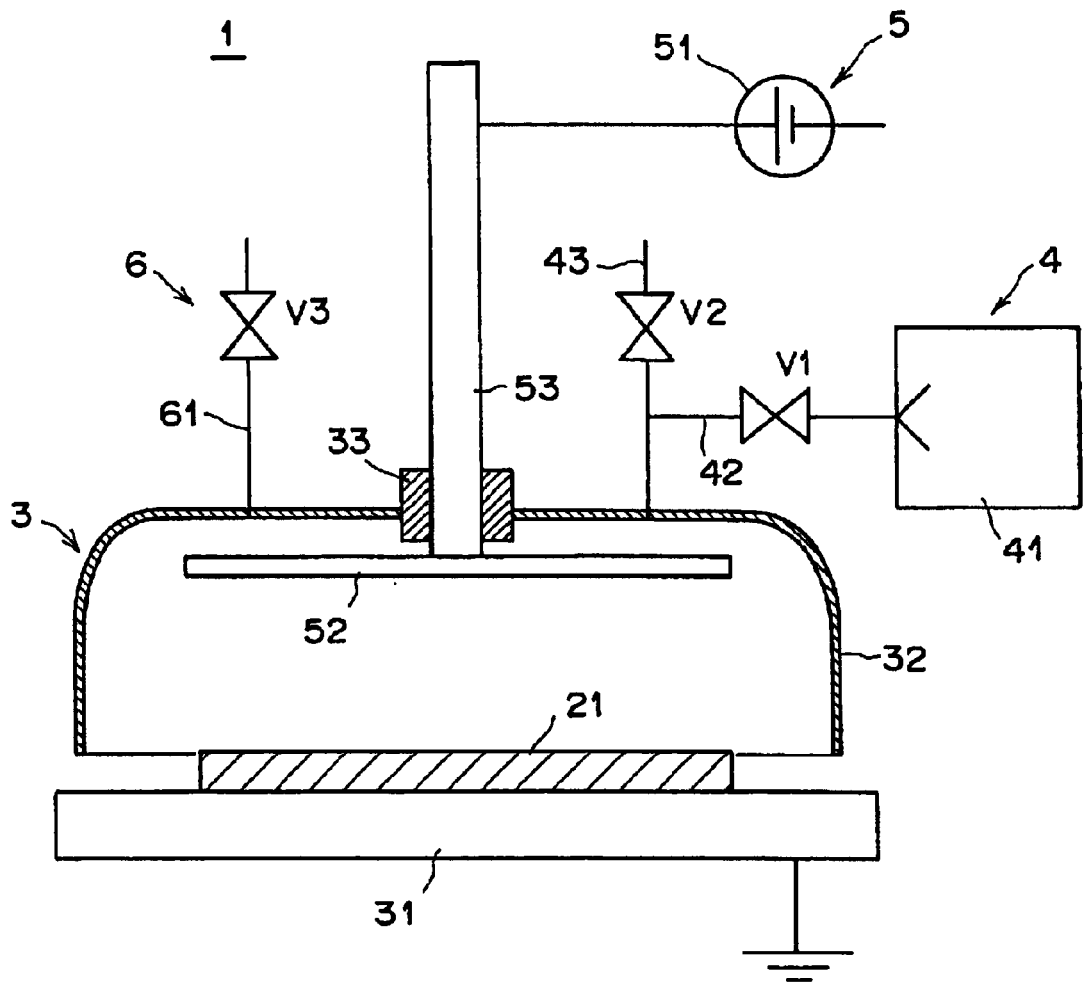
FIG. 3 is a schematic drawing of a cleaning apparatus in the state of cleaning the pattern surface of the substrate of the master medium shown in FIG. 2.

Next, the cleaning method according to the present invention will be explained. FIG. 2 is a cross-sectional view of the main part of a master medium according to an embodiment of the present invention. FIG. 3 is a schematic drawing of the cleaning apparatus of FIG. 1 in the state of cleaning the pattern surface of the substrate of the master medium shown in FIG. 2.

As shown in FIG. 2, the magnetic transfer master medium 2 comprises a substrate 21 having formed on the surface thereof a micro uneven pattern corresponding to the data to be transferred; and a magnetic layer 22 (a soft magnetic layer) formed over said pattern by use of a sputtering process or the like.

The basic outline of the formation of the master medium 2 is as follows. After a substrate 21 having a micro uneven pattern formed on the surface thereof by any of a variety of methods has been obtained, a protective layer (not shown) composed of an organic material is formed over the pattern surface so as to prevent said pattern surface from being marred, as well as to prevent foreign matter from becoming adhered thereto. Before the substrate 21 is conveyed to the station at which the magnetic layer 22 forming process is performed, the protective layer is peeled away from the pattern surface, and the pattern surface of the substrate 21 is subjected to a cleaning process employing a plasma discharge carried out within an evacuated reactive gas environment by the cleaning apparatus 1. Then, the magnetic layer 22 is formed over the pattern surface of the substrate 21 by use of a film forming apparatus or the like.

Therefore, the cleaning process performed by the cleaning apparatus 1 is a dry, non-contact removal process employing reactive gas plasma etching for removing the remaining material of the protective layer from the pattern surface of the substrate 21. That is to say, a reactive gas is introduced into the chamber 3, which is in a depressurize state, containing the substrate 21, and a discharge voltage is generated therein, whereby the remaining material of the protective layer that has adhered to the pattern surface of the substrate 21 are incinerated and thereby removed.

The specific configuration of the cleaning apparatus 1 is the same as that of FIG. 1, and further explanation thereof has been omitted. The base member 31 or the cover member 32 of the cleaning apparatus 1 is moved and the chamber 3 is opened, the substrate 21 is loaded onto the base 31 at a predetermined position wherein the uneven pattern surface thereof is facing upward. The base member 31 or the cover member 32 of the cleaning apparatus 1 is moved and the vaccum chamber 3 is closed, the first valve V1 is opened and the valve second valve V2 closed, and the vacuum pump 41 is activated so that the air within the interior of the chamber 3 is removed by the vacuum suction force and said interior is depressurized to a predetermined pressure. When the predetermined pressure has been obtained, the third valve V3 is opened and the reactive gas is introduced to the interior of the chamber 3 via the gas introducing channel 61. When a predetermined gas composition has been obtained within the interior of the chamber 3, a discharge voltage is applied between the substrate 21 and the plate shaped electrode 52 by the power source 51 (a DC power source), whereby a plasma discharge is generated on the pattern surface of the substrate 21. According to this plasma discharge of reactive gas, the foreign matter originating from the protective layer as well as the other foreign matter adhered to the surface of the master medium is incinerated and thereby removed by a plasma etching action.

When a cleaning process of a predetermined duration has been completed, the first valve V1 and the third valve V3 are closed and the second valve V2 opened, whereby air from the atmosphere is introduced via the leakage channel 43, and the pressure within the interior of the chamber 3 rises to that of the atmosphere. Then, the base member 31 or the cover member 32 of the cleaning apparatus 1 is moved and the vacuum chamber 3 is opened, the substrate 21 on the base member 31 is removed, the next substrate 21 is loaded thereon, and the cleaning process is performed as described above.

The substrate 21 that has been subjected to the cleaning process is then conveyed to a film forming apparatus, wherein the magnetic layer 22 is formed over the pattern surface thereof to produce a master medium 2. Further, the film forming apparatus can be equipped with a cleaning function employing plasma, whereby the cleaning process and the film forming process can be performed as continuous operations with the apparatus.

Note that because the DC power source 51 generates a discharge across the entire pattern surface of the substrate 21, it is preferable that the substrate 21 be formed of a conductive material so that said substrate 21 can be electrically grounded when loaded on the base member 31. Further, the power source of the discharging means 5 can be an RF power source instead of a DC power source. In this case, even if the substrate 21 is insulated and not grounded to the base member 31, the cleaning process wherein a plasma discharge is generated on the pattern surface of the substrate 21 can be performed. When an RF power source is used, the RF power source may be connected to generate a plasma discharge with the base member electrically floated and the foreign matter originating from the protective layer as well as the other foreign matter adhered thereto the surface of the master medium can be incinerated, and removed thereby.

The substrate 21 of the master medium 2 can be formed of Ni, Si, Al, an alloy, or the like. The uneven pattern can be formed by use of a sputtering process or the like.

A layer of photoresist is formed on the smooth, flat surface of a glass substrate (or a quartz substrate) by use of a spin coating process; then, a laser beam (or an electron beam), which is modulated in correspondence to a servo signal, is emitted while this glass substrate is being rotated, and a predetermined pattern, such as that corresponding to a servo signal, is exposed. Then, the photoresist is subjected to a development process, the exposed portion of the photoresist is removed and an original disk having an uneven pattern formed by the remaining photoresist is obtained thereby. Next, the surface of the uneven pattern thus formed on the surface of the original disk is subjected to a plating process (electroforming), whereby an Ni substrate having a positive uneven pattern is formed; said Ni substrate is then peeled away from the original disk. It is preferable that the depth (the height of the protrusions) of the uneven pattern formed on the substrate be in the range of 80–800 nm; and more preferably, in the range of 150–600 nm.

Further, the aforementioned original disk can be metal plated to form a second original disk, and this second original disk used to perform a further metal plating process, whereby a substrate having a negative uneven pattern can be formed. Also, a third original disk can be formed by metal plating the second original disk or by hardening of a synthetic resin impressed onto the second original disk; this third original disk can be metal plated to obtain a substrate having a positive uneven pattern. On the other hand, after the uneven pattern has been formed of photoresist on the glass substrate, etching can be performed to form grooves in the glass substrate, whereby a substrate from which photoresist has been removed can be obtained; a substrate can be formed therefrom based on any of the methods described above.

The magnetic layer 22 is formed of a magnetic material and by use of a physical vacuum deposition such as a vacuum deposition method, a sputtering method, an ion plating method, or by a metal plating method, etc. As to the material forming the magnetic layer 22, Co, a Co alloy (CoNi, CoNiZr, CoNbTaZr, or the like), Fe, an Fe alloy (FeCo, FeCoNi, FeNiMo, FeAlSi, FeAl, FeTaN), Ni, an Ni alloy (NiFe), or the like can be employed therefor; it is particularly preferable that FeCo, or FeCoNi be employed. It is preferable that the thickness of the magnetic layer 22 be in the range of 50–500 nm, and even more preferably, in the range of 100–400 nm.

According to the current embodiment of the present invention described above, by employing a cleaning process wherein a plasma discharge is generated in an evacuated reactive gas environment by the cleaning apparatus 1 on the pattern surface of the substrate 21, to clean the pattern surface of the substrate 21 before the formation of the magnetic layer 22 thereon, the foreign matter originating from the protective layer as well as the other foreign matter adhered thereto can be incinerated by the action of a plasma etching and removed thereby; whereby a favorable cleaning can be performed, and the quantity of foreign matter originating from the protective layer and which has become adhered to the surface of the substrate 21 can be reduced. As a result, the contact property between the master medium and the slave medium when a magnetic transfer is to be performed can be improved, the occurrence of signal omissions due to foreign matter adhered on the data bearing surface of the master medium can be prevented, whereby magnetic transfers having excellent transfer quality can be performed, and the life span of the master medium can be extended by the prevention of the peeling away of the magnetic layer 22.

Figure 4:
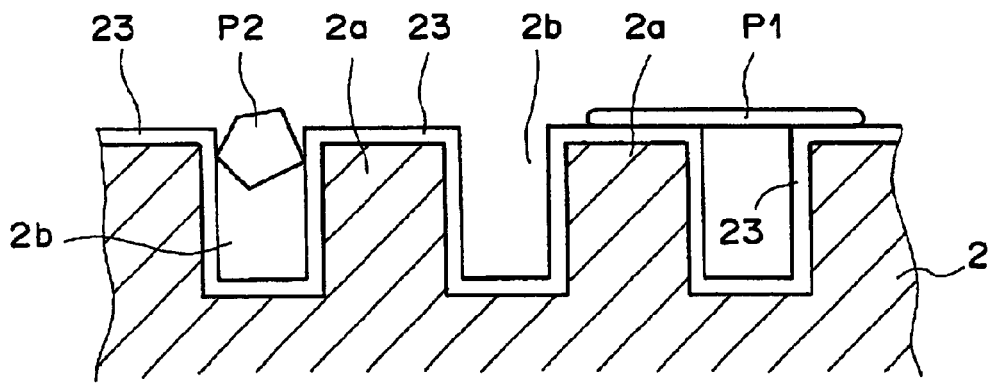
FIG. 4 is a cross-sectional view of a magnetic transfer master medium according to another embodiment of the present invention, in the state before having been subjected to the cleaning processes.
Figure 5:
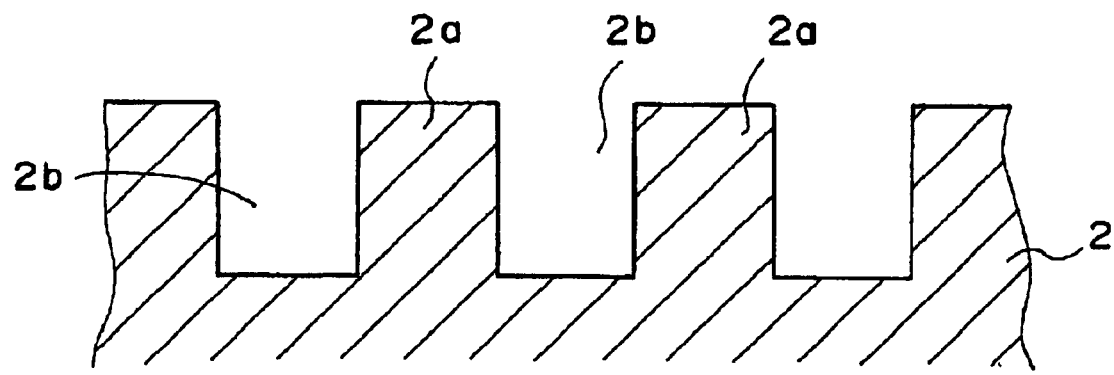
FIG. 5 is a cross-sectional view of a magnetic transfer master medium of FIG. 4 in the state after having been subjected to the cleaning process.

Next, another cleaning method according to the present invention will be explained. FIG. 4 is a cross-sectional view of a magnetic transfer master medium according to an embodiment of the present invention, in the state before having been subjected to the cleaning processes. FIG. 5 is a cross-sectional view of a magnetic transfer master medium of FIG. 4 in the state after having been subjected to the cleaning process. Further, each drawing is a model drawing; the actual dimensions of the portions shown therein are of a different ratio.

A discoid magnetic transfer or optical disk master medium 2 is formed, wherein one surface thereof is provided with a micro uneven pattern formed of protrusion portions 2a and depression portions 2b corresponding to the transfer data (for example, servo signals) or the formation data. In the case of the magnetic transfer master medium, as shown in detail in FIG. 2, the top surface of the protrusion portions 2a are formed by a magnetic layer. Further, in the case of the optical disk master medium, the depression portions 2b form the pits (protrusion portions) of the optical disk.

Then, a cleaning film 23 is formed over the uneven pattern surface of the data bearing surface. The film 23 covers the upper surface of the protrusion portions 2a, the side surfaces of the protrusion protrusions 2a, that is, the surface of the walls of the depression portions 2b, and the bottom surface of the depression portions 2b.

Over the course of repeated conjoinments with slave mediums to perform magnetic transfers, or the repeated formation of resin layers, the film 23 of the respective magnetic transfer master medium 2 or optical disk master medium 2 becomes littered with adhered foreign matter P1, P2 consisting of fiber strands, minute particulate matter and the like. For example, a fiber-shaped adhered matter P1 becomes impressed onto the surface of a protrusion potion 2a, a particle-shaped adhered matter P2 becomes embedded within a depression portion 2b between two protrusion portions 2a, and because of the size thereof, lodged in the depression portion 2b.

The method of cleaning the adhered matter P1, P2 from the surface of the master mediums 2 is a method of removing the adhered matter P1, P2 along with the film 23 to obtain a cleaned master medium 2 such as that shown in FIG. 5. In this manner, the adhered matter P2 adhered to the surface of the protrusion portion 2a is separated and removed from said surface along with the removal of the film 23. The adhered matter P2 lodged within the depression portion 2b is dislodged therefrom by the widening of the channel of the depression portion 2b by the removal of the film 23 from the surface of the walls of said depression portion 2b.

The film 23 is a carbon layer; wherein, when the cleaning process is to be performed, this carbon layer is removed by the use of plasma. The film 23 can be formed on the surface of the master medium 2 by use of any of a variety of film forming methods: a sputtering method of sputtering a material containing carbon onto the surface of the master medium; a film forming method employing CVD; etc. The film 23 is formed so that the thickness thereof is less than or equal to 40 nm (preferably, 5–30 nm) on the surface of the protrusion portions 2a. In this manner, a favorable transfer resolution can be ensured for when the surface of the protrusion portions 2a are brought near the slave medium to perform a magnetic transfer; in the case that an optical disk is to be formed, the formation property thereof can be ensured for. If the film 23 is thicker than 40 nm, in the case that a magnetic transfer is to be performed, the distance between the surface of the pattern and the slave medium is increased, causing a deterioration of the transfer property and a reduction in the transfer resolution, and in the case that an optical disk is to be formed, the change in the disk formation dimensions becomes large.

Further, the plasma cleaning method is a method of utilizing a plasma discharge carried out in an evacuated reactive gas environment, wherein the film 23 and the adhered matter P1, P2 are incinerated, and thereby removed from the pattern surface of the substrate 21. The plasma cleaning (reactive plasma etching), is performed, for example, utilizing the cleaning apparatus 1, wherein: a master medium that has been removed from a magnetic transfer apparatus or an optical disk forming apparatus is emplaced in the vacuum chamber 3 (a vacuum chamber) of the cleaning apparatus 1; a reactive gas is introduced to the interior of he chamber 3; and a plasma discharge is generated between the electrode and the master medium 2. The reactive gas can be a composition containing Ar, $O_2$, $CCl_4$, and the like.

Further, as an alternative embodiment, the film 23 can be a polymer film; wherein, when the cleaning process is to be performed, this polymer film can be dissolved by a solvent or removed by the use of the above-described plasma cleaning process. The polymer film can be formed on the surface of the master medium by use of a vapor deposition film forming method or the like. Alternatively, the removal of the film 23 can also be performed by subjecting the master medium 2 to an ultrasound cleansing, whereby the film 23 is peeled away from the surface of the master medium by the application thereto of ultrasound vibrations.

For cases in which the master medium 2 is to be reused to perform magnetic transfers or optical disk formations again after having been subjected to the cleaning process, the film 23 is reformed on the respective data bearing surface thereof, as shown in FIG. 4, and the master medium 2 is reused.

Figure 6:
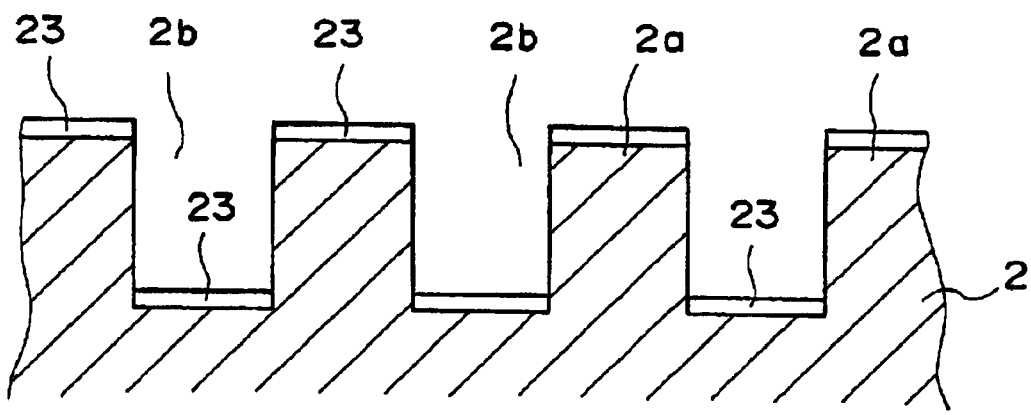
FIG. 6 is a cross-sectional view of another embodiment of the magnetic transfer master medium of FIG. 4.

For cases in which the film 23 is provided over the surface of the side walls of the depression portions 2b of the data bearing surface of an optical disk master medium 2, because the optical disks are formed according to the form of the uneven pattern, it is preferable that the widths of the depression portions 2b be made larger than the width of the pits (pit diameter) of the formed optical disks, by a thickness corresponding to the thickness of the film 23. Note that this is not required for cases in which the film 23 is provided by use of a sputtering process or the like, wherein, as shown in FIG. 6, the film 23 is provided over the upper surface of the protrusion portions 2a and the bottom surface of the depression portions 2b, and is not provided on the surface of the side walls of the depression portions 2b. In this case, although the adhered matter P1 adhered to the surface of the protrusion portions 2a is removed along with the film 23; it is difficult to remove the adhered matter P1 that has become lodged in the depression portions 2b. In consideration of this point, as described above, it is more effective if the film 23 is provided by use of a CVD process or the like so as to also cover the surface of the side walls of the depression portions 2b.

Further, in the case of the magnetic transfer master medium, the film 23, which is to be removed when the cleaning process is performed, can be the magnetic layer 22 formed on the pattern surface of the substrate 21. When the cleaning process is to be performed, the adhered matter P1, P2 are removed along with the magnetic layer 22, and when the master medium 2 is to be reused, the magnetic layer 22 is again formed by a sputtering process or the like. Because the magnetic layer 22 is formed comparatively thickly on the upper surface of the protrusion portions 2a, the removal of the adhered matter P2 lodged in the depression portions 2b can also be favorably performed.

Note that the slave medium can be subjected to a cleaning process employing a glide head cleaner, an abrasive material, or the like, for removing the microscopic burrs on the surface thereof or the foreign matter adhered thereto, before being conjoined with the magnetic transfer master medium 2, as required. On the other hand, it is preferable that the master medium 2 be subjected to a cleaning process before the conjoinment process in the case of a magnetic transfer or the resin injection process in the case of optical disk formation, wherein the film 23 is not removed, and the foreign matter is removed.

According to the current embodiment as well, it is advantageous that the cleaning of the master medium 2 be performed in connection with the magnetic transfer or optical disk manufacture for each magnetic transfer (disk formation process); the master medium 2 is removed from the magnetic transfer apparatus (disk forming apparatus) after the magnetic transfer (disk formation) has been performed a predetermined number of times, or when transfer deficiencies (formation deficiencies) due to foreign matter adhered to the surface of the master medium occur, and the cleaning process is performed. At this time, it is desirable that a plurality of master mediums 2 be prepared in advance, and that successive magnetic transfers (disk formations) and cleaning processes are performed repeatedly.

According to the current embodiment described above, a film 23 is provided on the uneven pattern surface of the data bearing surface of the magnetic transfer or optical disk master medium 2: the master medium 2, to which foreign matter has becomes adhered to the pattern surface thereof over the course of repeated magnetic transfer or disk formation operations, is removed from the magnetic transfer apparatus or the disk formation apparatus; the foreign matter that has adhered to the surface of the master medium 2 is removed together with the film 23 by a the cleaning apparatus, which employs a plasma cleaning process or the like; whereby, the foreign matter including foreign matter lodged within the depression portions, particulate matter, and even minute particulate matter can be positively removed without marring said surface, maintaining the performance of favorable magnetic transfer and disk formation operations, and extending the life span of the master medium by enabling the reuse thereof.

What is claimed is:

1. A master medium cleaning method that is a method of removing foreign matter adhered to the data bearing surface, on which an uneven pattern corresponding to data has been formed, of a master medium, comprising the steps of:

providing a film over the data bearing surface of the master medium so that said uneven pattern remains tactile through said film, and removing the foreign matter adhered to the data bearing surface of the master medium along with said film.

2. A master medium cleaning method as defined in claim 1, further comprising the step of:

re-forming said film over the data bearing surface of the master medium after said master medium has been subjected to the cleaning process.

3. A master medium cleaning method as defined in claim 1, wherein said master medium is an optical disk master medium comprising an uneven pattern for forming pits of an optical disk.

4. A master medium cleaning method as defined in claim 1, wherein said film is a polymer film, and the polymeric film is removed by a solvent, or by the use of a plasma discharge.

5. A master medium cleaning method that is a method of removing foreign matter adhered to the data bearing surface, on which an uneven pattern corresponding to data has been formed, of a master medium, comprising the steps of:

providing a film over the data bearing surface of the master medium, wherein said film has a thickness of less than or equal to 40 nm, and removing the foreign matter adhered to the data bearing surface of the master medium along with said film.

6. A master medium cleaning method as defined in claim 5, wherein said master medium is a magnetic transfer master medium comprising an uneven pattern formed of a magnetic layer, and said film is formed over the magnetic layer.

7. A master medium cleaning method as defined in claim 5, wherein said film is a polymer film, and the polymeric film is removed by a solvent, or by the use of a plasma discharge.

8. A master medium cleaning method that is a method of removing foreign matter adhered to the data bearing surface, on which an uneven pattern corresponding to data has been formed, of a master medium, comprising the steps of:

providing a film over the data bearing surface of the master medium, and removing the foreign matter adhered to the data bearing surface of the master medium along with said film, wherein said film is a carbon layer, and the carbon layer is removed by the use of a plasma discharge carried out in an evacuated reactive gas environment.

9. A master medium cleaning method that is a method of removing foreign matter adhered to the data bearing surface, on which an uneven pattern corresponding to data has been formed, of a master medium, comprising the steps of;

providing a film over the data bearing surface of the master medium, and removing the foreign matter adhered to the data bearing surface of the master medium along with said film, wherein said master medium is a magnetic transfer master medium comprising an uneven pattern formed of a magnetic layer, and said film is the magnetic layer provided over the pattern surface of the substrate, wherein the magnetic layer is removed when the cleaning process is performed, and the magnetic film is again formed on the pattern surface of the substrate when the master medium is to be reused.

* * * * *